W. R. HUDDLESTON.
AUTOMATIC DRAIN VALVE.
APPLICATION FILED AUG. 26, 1913.

1,094,209.

Patented Apr. 21, 1914.

WITNESSES
L. H. Schmidt
C. E. Trainor

INVENTOR
WILLIAM R. HUDDLESTON,
BY Munn & Co.
ATTORNEYS

UNITED STATES PATENT OFFICE.

WILLIAM R. HUDDLESTON, OF BROWNSVILLE, TEXAS.

AUTOMATIC DRAIN-VALVE.

1,094,209.   Specification of Letters Patent.   Patented Apr. 21, 1914.

Application filed August 26, 1913. Serial No. 786,772.

*To all whom it may concern:*

Be it known that I, WILLIAM R. HUDDLESTON, a citizen of the United States, and a resident of Brownsville, in the county of Cameron and State of Texas, have made certain new and useful Improvements in Automatic Drain-Valves, of which the following is a specification.

My invention is an improvement in automatic drain valves, and has for its object to provide a valve of the character specified, adapted for use in connection with the main reservoir of air braking systems, for automatically draining the reservoir and the system of water, wherein a normally open spring supported valve is provided, adapted to be closed by the pressure in the system, when such pressure exceeds the normal atmospheric pressure.

Figure 1:
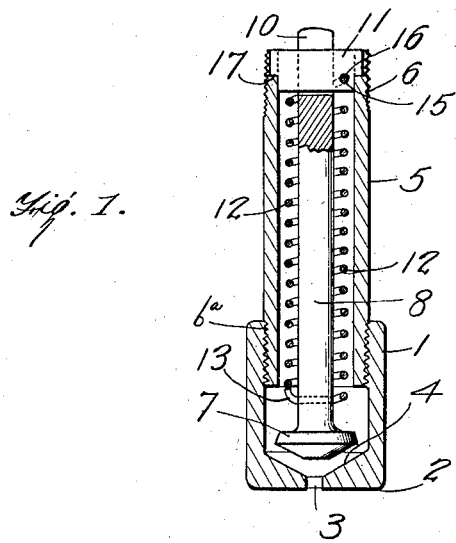
Figure 2:
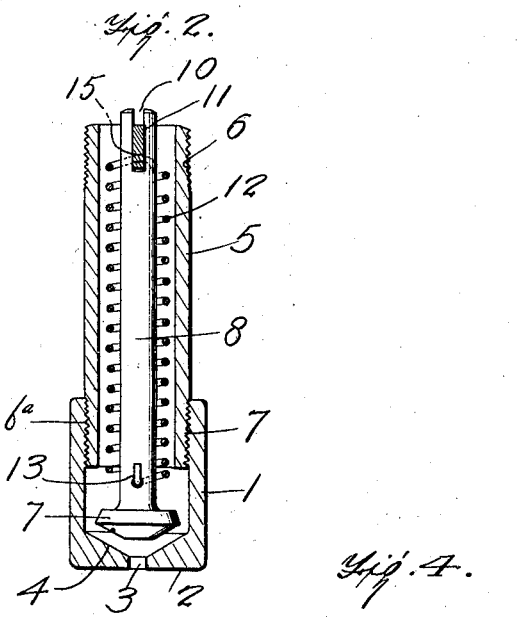
Figure 3:
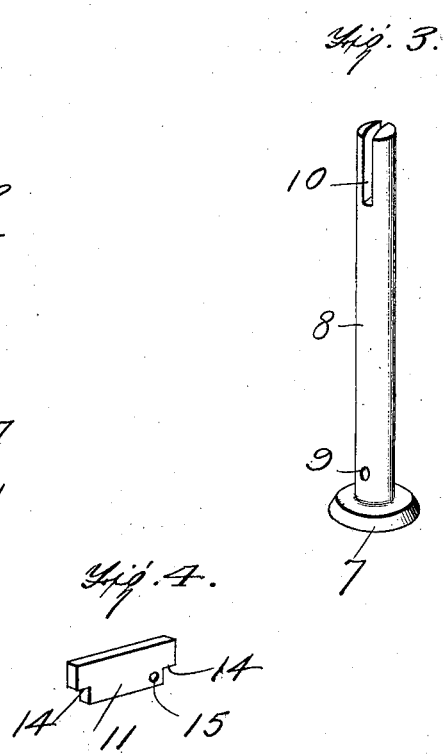
Figure 4:
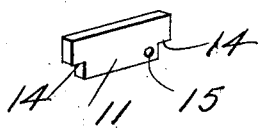

In the drawings: Figure 1 is a longitudinal section of the improved valve, Fig. 2 is a section at right angles to Fig. 1, Fig. 3 is a perspective view of the valve and its stem, and, Fig. 4 is a similar view of the cross head.

The present embodiment of the invention comprises a casing consisting of a lower portion 1 having its lower end partially closed, as shown at 2, and having a central opening 3, and the said end is tapered on its inner face, as shown at 4, to form a valve seat for coöperation with the valve to be described.

The section 1 of the casing is internally threaded at its upper end, for engagement by the upper section 5 of the casing, the said upper section being of less diameter than the section 1, and having its ends externally threaded, as shown at 6 and 6ᵃ, the threaded portion 6ᵃ engaging within the lower section 1.

The threaded portion 6 of the casing is adapted to be engaged with the reservoir, the said reservoir having an opening tapped therein for receiving the said threaded end 6 of the upper section 5. The valve 7 consists of two frusto-conical portions having their large ends together, and the lower frusto-conical portion is arranged to fit the seat 4 of the valve casing. A stem 8 is integral with the valve, and the said stem is provided with a transverse opening 9 near the valve, and with a transverse longitudinally extending slot or recess 10 at its upper end.

A cross head 11 coöperates with the stem, the said cross head being received in the slot or recess 10, and the said cross head is of a length greater than the diameter of the upper section of pipe 5 of the casing. A coil spring 12 is arranged within the pipe 5, and one end of the spring is passed through the opening 9 of the stem, and bent, as shown at 13, to prevent disengagement of the said end. The cross head 11 is provided at each of its ends, and at its lower edge with a notch 14, and with an opening 15 near one of the notches. The upper end of the coil spring 12 is passed through the opening 15, as indicated at 16 in Fig. 1. The upper end of the pipe 5 is provided with diametrically opposite slots or recesses 17, the said slots or recesses being of a length to receive the ends of the cross head beyond the notches 14.

In operation, the main reservoir is tapped, as before mentioned, to receive the threaded portion 6 of the pipe 5. The spring 12 is arranged to hold the valve in the position shown in Figs. 1 and 2, and the slot or recess 10 is of a depth to permit the valve to stand in this position, when the ends of the said cross head are received in the slots or recesses 17, before mentioned.

As is known, when the air pump of a braking system is working, it forces a certain per cent. of water and discharges it into the main reservoir, and this water backs up into the train line and the sand pipes, and decreases the efficiency of the brakes. In addition, the sand is wetted in the sand pipe, and does not flow properly, for as known, such sand is carefully baked to remove as much moisture as possible, in order that it may flow freely.

The present invention is designed to withdraw this water, otherwise rust will form in the reservoir, and as it is carried away by the action of the air and the water it is forced into the ports of the valve, decreasing their efficiency to a very great extent, and frequently preventing the proper action of the brakes.

With the improved valve all of the water left in the reservoir will be drawn off. The spring is not strong enough to hold the valve in open position against the air pressure which acts upon the upper face thereof. As soon as this pressure is released, the spring will lift the valve, and the water will drain off. The spring is of such strength that five pounds pressure on the upper face thereof will close the same. Thus, four or five strokes of the air pump would cause the valve to shut, and at no time thereafter would it interfere with the proper action of the valves. The improved valve is so arranged, that the upper end of the pipe 5 will be flush with the inner face of the reservoir, and a fluid tight joint is formed at the point where it engages the reservoir.

I claim:

1. A valve casing for use in air brake systems for draining the system and comprising a pipe having its ends threaded and adapted to engage at one end the main reservoir of the system at the lower side thereof, a casing engaging the lower end of the pipe, said casing having its lower end partially closed and provided with a central opening, and with a tapered valve seat encircling the opening, a valve fitting the seat for closing the same, said valve having a stem extending upward through the pipe, said stem being slotted transversely at its upper end, a crosshead in the slot, the first-named pipe having diametrical recesses for receiving the ends of the cross head, and a coil spring encircling the stem, said spring having one of its ends connected with the cross head and the other with the stem, and acting normally to hold the valve in open position, said spring being adapted to yield to close the valve when the air pressure increases in the reservoir.

2. A valve casing for use in air brake systems for draining the system and comprising a pipe having its ends threaded and adapted to engage at one end the reservoir at the lower side thereof, a casing engaging the lower end of the pipe, said casing having its lower end partially closed and provided with a central opening, and with a tapered valve seat encircling the opening, a valve fitting the seat for closing the same, said valve having a stem extending upward through the pipe, said stem being slotted transversely at its upper end, a cross head in the slot, the first-named pipe having diametrical recesses for receiving the ends of the cross head, a spring between the cross head and the stem and acting normally to hold the valve open and adapted to yield when the air pressure in the reservoir exceeds the atmospheric pressure.

3. A valve casing for use in air brake systems, and comprising a pipe adapted for engagement with the system at one end, a casing detachably connected with the other end of the pipe and having the end remote from the pipe partially closed and provided with a central port, a valve coöperating with the port for closing the same, a stem in connection with the valve and extending upwardly through the pipe and having its upper end transversely slotted, a cross head in the slot, for guiding the said upper end of the system, the ends of the cross head having a detachable connection with the pipe, and a spring arranged between the cross head and the stem and normally holding the valve away from the port.

WILLIAM R. HUDDLESTON.

Witnesses:
B. B. BARBOUR,
IRA WEBSTER.